June 16, 1964        E. KÄSEMANN        3,137,784
DEVICE FOR PROTECTING THE EYES OF WELDERS
Filed Feb. 19, 1962
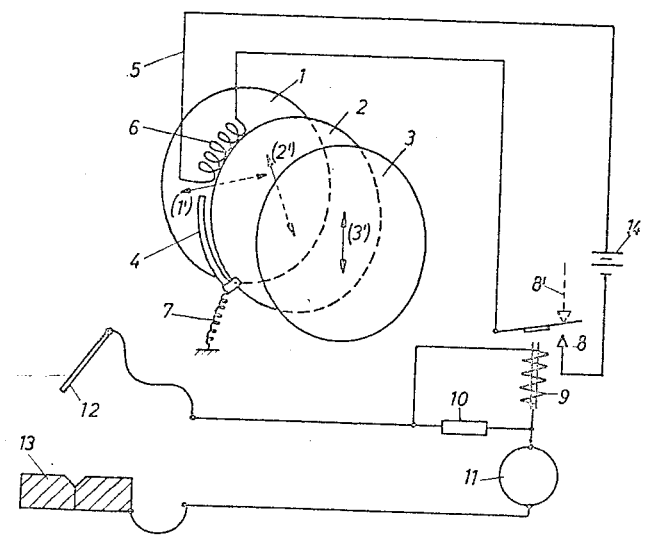
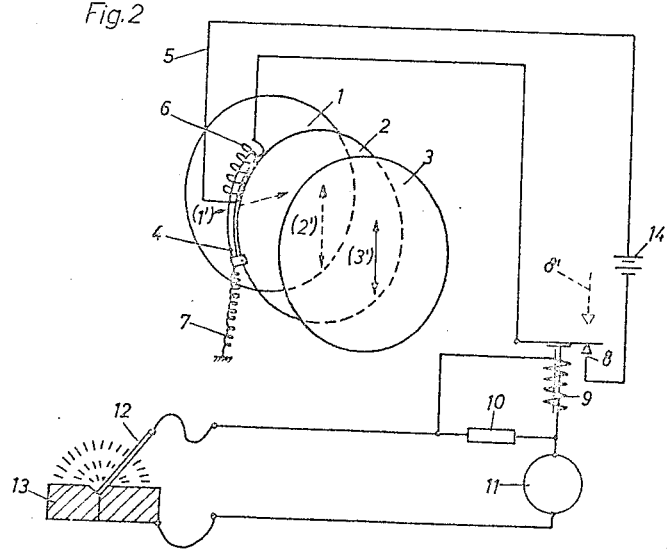
INVENTOR
ERWIN KÄSEMANN
BY
ATTORNEY

United States Patent Office 3,137,784
Patented June 16, 1964

3,137,784
DEVICE FOR PROTECTING THE EYES
OF WELDERS
Erwin Käsemann, Auerburgstrasse 5,
Oberaudorf 13b (Inn), Germany
Filed Feb. 19, 1962, Ser. No. 174,067
Claims priority, application Germany Feb. 27, 1961
4 Claims. (Cl. 219—147)

The instant invention relates to an arrangement for protecting the eyes of electric welders. Known arrangements, such as masks, of this type consist substantially of a shield, opaque to rays, in which a window of appropriate protective glass is cut for the eyes of the welder. Such glass must strongly absorb in the visible spectrum as well as in the ultraviolet and infrared regions. In such connection, it is disturbing that the welder, due to the strong absorption of the visible spectrum by the protective glass, sees the region at which welds are made and the workpiece only for the duration of the arc. As soon as the arc extinguishes, the welder must move the shield, usually held in one hand, aside and view the workpiece with the naked eye. This disadvantage of normal protective welder's goggles results in unnceessarily increased working time and in addition, renders of increased difficulty forming the protective shield as a simpler helmet supported by the head and shoulders of the welder, thus leaving both hands free to perform the required work.

As a result, there have been numerous attempts movably to dispose the protective glasses in welder's shields or helmets. For example, it has been proposed to move the protective glass or glasses into the line of sight of the welder by electromagnets just as soon as the welding wire engages the workpiece and generates an arc; the protective glass or glasses being automatically swung out of such line of sight as soon as the arc goes out. However, this type of movable protective glasses cannot be made practical in that the electrical expenditure, due to the necessarily long path to the protective glass or glasses, does not assure adequate operational safety.

It was further proposed, for this reason, that there be inserted in the welder's line of sight two successively disposed polarization filters of which one is stationary while the second, when the arc extinguishes, is rotated through such an angle that the welder can view the workpiece, and for so long as the arc is struck, the rotatable polarization filter is rotated into the dark position and thus guarantees that the required absorption is provided.

The instant invention relates to a markedly improved device of the last mentioned type. When using a fixed filter and a second filter relatively rotatable thereto, it is necessary that the second polarizing filter be rotated at least 30° to 40° from the dark position in order to reduce the total absorption by both filters sufficiently to permit adequate direct viewing of the workpiece. Such large angular values, however, call for electromagnetic and/or mechanical devices which work at very high stress and under heavy demand, and hence are not sufficiently reliable. In accordance with the instant invention, in place of a fixed polarization filter and a rotatable polarization filter in the window of the protective shield or helmet, two fixed polarization filters having directions of vibration crossing each other at right angles, are utilized which in the dark position have maximum absorption for visible and ultraviolet light. In order to enable positive reduction in this absorption before and after the welding operation proper without removal of the protective screen or helmet, a disk of non-absorbing but optically doubly refracting material is disposed between the two stationary polarization filters. On suitable dimensioning of the double refraction and difference in the path length of the split wave in this disc, it is possible to halve the angle of rotation, as compared to the angle of rotation required of two polarization filters, to obtain a predetermined increase in brightness, that is, decrease in absorption, and thus markedly to increase positive operation as contrasted to the prior art structure.

The invention will be more clearly understood, and its objects and features clarified, by the following description of an illustrative embodiment thereof when read in conjunction with the drawing in which the device of the invention is shown in simplified form omitting the protective shield or protective helmet per se, with the elements of the device in FIG. 1 shown in the position occupied before the welding arc is struck, and in FIG. 2 after the arc is struck and while the arc is maintained.

Referring to the drawing, polarization filters 1 and 3 have directions of vibration which, as shown by the double headed arrows referenced 1' and 3' respectively, cross at right angles and hence result in maximum absorption. Between the two absorption filters, a double refracting disc 2, of mica, crystalline quartz, or a molecularly oriented synthetic, which can be rotated about its center and in so doing change the direction of its principal axis, as indicated by the double headed arrow referenced 2' relative to the vibrational directions 1' and 3'. Preferably the double refraction in disc 2 is based upon the path difference of a half wavelength at the middle of the visible spectrum, for then on rotation of disc 2 through but 45° about its center, practically the same increase in brightness of the polarized field is obtained as would be obtained, without the disc, only after a 90° rotation about its center of the polarization filters. In view of the non-linear angular relationship (the increase in brightness being proportional to twice the square of the sine of the angle of rotation), generally complete brightness is not required; angles considerably less than 45° suffice to meet practical requirements as to reduction in absorption.

In order to render positive the increasing brightening of the line of sight, the disc rotatable about its center is provided with a movable bent iron rod 4, which with its one end is positioned opposite one pole of the solenoid 6 and with the other end fastened to spring 7. The latter is anchored at its remote end in the shield or helmet and maintains disc 2 at rest in the position regarded as resulting in maximum brightness, as shown in FIG. 1. Solenoid 6 is connected, by way of contact 8 of relay 9 and wire 5 with a source of potential 14, for example a dry battery. Rotation of disc 2 about its center is positive on closure of the circuit from generator 11, through resistor 10, welding wire 12, and workpiece 13. On closing this circuit, a potential difference between the terminals of resistor 10 results, which in turn energizes electromagnet 9 of the control relay for solenoid 6. The latter on energization attracts the iron rod 4 and rotates birefringent disc 2 into a neutral axis position relative to polarization filters 1 and 3, and thus provides the necessary protection for the eyes of the welder (FIG. 2). As soon as the circuit of generator 11 is interrupted by lifting welding wire 12 from the workpiece 13, electromagnet 9 no longer receives current and breaks contact 8. As a result solenoid 6 is also without current and releases lever 4 so that disc 2 snaps back into the acute axis position (FIG. 1) relative to polarization filters 1 and 3, and the dark field of the polarization filters again becomes bright. Accidental blinding of the welder is impossible with the instant arrangement in that on renewed contact of the welding wire with the workpiece, electromagnet 9, and hence solenoid 6 also, again positively is energized and disc 2 is rotated into the neutral position of maximum absorption, thus giving the necessary eye protection.

Obviously, rotation of disc 2 may be obtained by other means, for example, a rotating armature in the nature of an electric motor actuating disc 2 by way of a rope or cable drive, etc. It is particularly advantageous to make the neutral position of disc 2 as its rest position and to permit rotation only in the absence of the main current, so that eye protection is maintained also in the event of power operational failure. In such case, contact 8 should be disposed to the other side of the relay spring of electromagnet 9 (schematically shown in the broken line position 8' in both figures) and to interchange the positions shown in FIGS. 1 and 2 of the disc. Brightening of the field of view takes place in such case only when elements 4, 5, 6, 7 and 14 work correctly but not when potential source 14 is inoperative, as on exhaustion.

Mechanically to protect the relatively expensive polarization filters, as also the double-refracting disc, to obtain impaired protection which is not produced by the polarization filters, and to provide the device of the invention with filter-determined starting absorption in accordance with the size of the workpiece and the light intensity of the welding operation, there may be provided, in addition to the polarization filters, a suitable spectral screening glass in front of the filters in the direction of the incident light. It may also be advisable to make the largest angle of rotation of the double-refracting disc alterable at the place of utilization of the arrangement in accordance with the illumination at the work site. Such alteration can be realized easily by duly confining the total rotation of the birefringent disk through an adjustable stop or equivalent mechanical means not shown in the figures.

Examples of molecularly oriented synthetics suitable for use as disc 2 of this specification are the retardation plates known as half-wave plates or films which have been described on page 15 of the catalogue F 622, i.e. "Polaroid Laboratory Products," published by the Pioneer Scientific Corporation, Great Neck, New York.

What I claim is:

1. A device for protecting the eyes of welders against rays consisting of a pair of polarization filters positioned so that their directions of vibration cross each other, an optical birefringent disc producing a phase difference of about half a wave length of light at the middle of the visible spectrum, the disc being positioned between the polarization filters the pair, and means for rotating the disc about its center a predetermined amount for varying the total absorption of the crossed polarization filters in accordance with the rotated position of the disc axis.

2. The device according to claim 1 in which the disc at rest is positioned for minimum absorption by the filters, and the means for rotating the disc is electromechanical, a source of line potential for connection to the workpiece and the welding wire is provided, and the disc rotating means is energized to rotate the disc to the maximum absorption position only on contact between the workpiece to be welded and the welding wire.

3. A device for protecting the eyes of welders from the radiation emitted during electrical welding, comprising a pair of polarization filters mounted in the line of sight of the welder with their respective axes of vibration crossed to produce maximum ray absorption, a disc of a birefringent material producing a phase difference of about a half wave length of light at the middle of the visible spectrum, the disc being rotatably supported between the polarization filters with its principal axis at an angle to the axes of vibration of the filters, a clamp fastened to the rim of the disc, a solenoid, an iron rod cooperating with the solenoid and connected to the said clamp, a tension spring likewise connected to the clamp and having one end anchored to a fixed region of the device for restoring the disc to its original position, a pivotable armature connected to the solenoid, a first source of potential and a terminal normally open but engageable with the free end region of the armature, and a welding circuit including a second source of potential, a relay for moving on energization the armature to close on the contact, and a pair of terminals for connection, respectively, to a welding wire and a workpiece, closure of the welding circuit by engaging the welding wire to the workpiece energizing the relay to close the armature on the normally open contact to energize the solenoid to attract the iron rod rotating the disc against the tension of the spring to position the principal axis of the disc in alignment with the direction of vibration of one of the two filters.

4. A device for protecting the eyes of welders from the rays emitted during welding, comprising a pair of polarization filters in the line of sight of the welder with their respective axes of vibration crossed to produce maximum ray absorption, a disc of birefringent material producing a phase difference of about a half wave length of light at the middle of the visible spectrum, the disc being rotatably supported between the filters with its principal axis parallel to the vibration axis of one of the two filters, a clamp fastened to the rim of the disc, a solenoid, an iron rod cooperating with the solenoid and connected to the said clamp, a tension spring likewise connected to the clamp and having one end anchored in alterable regions of the device for adjusting the principal axis of the disc to a predetermined position with respect to the direction of vibration of the two polarization filters, a circuit connected to the solenoid and including a switch arm, a contact normally engaged by the latter, and a first source of potential which rotates the disc so that its principal axis is at an acute angle to the axis of vibration of each filter, and a welding circuit including a relay which on energization actuates the switch arm to open from the contact to permit the tension spring to rotate the disc to a position where its principal axis is considerably different from the axes of vibration of the two polarization filters, the relay being energized when the welding wire is connected to the workpiece to be welded.

References Cited in the file of this patent

UNITED STATES PATENTS

| | | |
|---|---|---|
| 2,237,566 | Land | Apr. 8, 1941 |
| 2,423,320 | Hurley | July 1, 1947 |
| 2,454,280 | Hardesty | Nov. 23, 1948 |
| 2,548,230 | Molyneux | Apr. 10, 1951 |